//  US008902483B2

(12) United States Patent
Aharon et al.

(10) Patent No.: US 8,902,483 B2
(45) Date of Patent: Dec. 2, 2014

(54) ACCURATE PRINTING OF A TARGET COLOUR

(75) Inventors: Michal Aharon, Haifa (IL); Eyal Shelef, Tel-Aviv (IL); Doron Shaked, Tivon (IL); Shlomo Harush, Nes-Ziona (IL); Tsafrir Yedid-Am, Jerusalem (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 13/259,619

(22) PCT Filed: Jul. 23, 2009

(86) PCT No.: PCT/US2009/051485
§ 371 (c)(1),
(2), (4) Date: Sep. 23, 2011

(87) PCT Pub. No.: WO2011/011004
PCT Pub. Date: Jan. 27, 2011

(65) Prior Publication Data
US 2012/0105878 A1    May 3, 2012

(51) Int. Cl.
*H04N 1/60*    (2006.01)
(52) U.S. Cl.
CPC ............. *H04N 1/605* (2013.01); *H04N 1/6033* (2013.01)
USPC .......................................... 358/518; 358/504
(58) Field of Classification Search
USPC ........... 358/1.9, 2.1, 504, 518, 520, 523, 530, 358/501, 500; 382/162, 167, 112; 347/19, 347/43
See application file for complete search history.

(56) References Cited

U.S. PATENT DOCUMENTS

| | | | |
|---|---|---|---|
| 5,537,516 A | 7/1996 | Sherman | |
| 6,698,860 B2 | 3/2004 | Berns et al. | |
| 7,252,360 B2 | 8/2007 | Hersch et al. | |
| 7,667,845 B2 * | 2/2010 | Takahashi et al. | 356/405 |
| 7,940,393 B2 * | 5/2011 | Noy et al. | 356/408 |
| 2006/0227397 A1 | 10/2006 | Goma et al. | |
| 2007/0097412 A1 * | 5/2007 | Peiro et al. | 358/1.14 |
| 2013/0021631 A1 * | 1/2013 | Nachlieli et al. | 358/1.9 |

FOREIGN PATENT DOCUMENTS

| | | |
|---|---|---|
| EP | 1634704 | 3/2006 |
| GB | 2431791 A | 5/2007 |
| JP | 2008/154008 | 7/2008 |
| WO | WO-9852347 A1 | 11/1998 |
| WO | WO-02/070261 | 9/2002 |

OTHER PUBLICATIONS

Supplementary European Search Report dated Dec. 12, 2013 for European Application: 09847644.3 (PCT/US2009/051485).
International Search Report and Written Opinion dated Mar. 24, 2010 issued on PCT Patent Application No. PCT/US2009/051485 filed on Jul. 23, 2009.

\* cited by examiner

*Primary Examiner* — Scott A Rogers

(57) ABSTRACT

A method of accurately printing a target color is provided. The method comprises: in a first step measuring the light spectrum (106) of a first printed color sample (104), which has been printed with a first ink coverage; and from the measured light spectrum calculating a color discrepancy between the first printed color sample and the target color. The method further comprises in a second step calculating an improved ink coverage (112), and printing a second color sample with the improved ink coverage (104). The aforementioned steps are repeated until a predetermined condition for accuracy of the target color has been reached (110).

26 Claims, 6 Drawing Sheets

ACCURATE PRINTING OF A TARGET COLOUR

TECHNICAL FIELD

The present invention is related to the field of colour printing and in particular to a method and system for improving the printed colour accuracy of a press.

BACKGROUND OF THE INVENTION

Colour accuracy is a critical performance specification of a printing device. In many applications very high accuracy (up to an accuracy of $\Delta E \leq 0.5$) is required for a number of reasons. $\Delta E$ is a measure of the colour difference between two colours, which is perceivable to the human eye. A $\Delta E$ value of one is the smallest colour difference perceivable to the human eye. Company logos are an example where a high degree of precision is required. Another example is when colour matching is required between a few printing devices, for example when digital prints are used to complete a run of a non-digital printing device, or when several prints are presented together. Consumer product packaging are often comprised of a plurality of prints originating from different sources. In such applications, colour accuracy between the different prints is crucial. One of the most demanding applications requiring high accuracy (possibly the highest) is when a label is required to match the colour of a product—this is the case when printing labels for ink cans, wall paint cans, hair dye, etc.

Currently several methods are used to achieve the requirements of high colour accuracy. The most common method is to use the Pantone colour conversion tables. These are colour conversions that were built specifically to match the Pantone swatch books. However, in some cases, due to a number of reasons such as press variability, ink variability, different type of substrates, etc., the first printed run of the colour, using the given values of the conversion, will produce a result that can be improved and needs to be improved for the given application. This improvement is usually done by an iterative procedure using an external measuring device or by a visual match to get closer to the desired target, increasing the setup time for each job. In cases where the desired colour is not part of the Pantone swatch book the regular conversions that are used produce even less accurate results.

Another solution is to use special inks with the exact colour of the desired target colour. This can be an acceptable solution where only very few colours are printed and where very long runs of the press are performed using the specific ink. This solution requires that an additional ink be supported and maintained in the press. In applications where several specific colours are required for a particular job, or where short runs of the press each with a different colour are required, this solution is not acceptable.

DETAILED DESCRIPTION OF THE INVENTION

Embodiments of the present invention are directed to a method and system for accurately printing a target colour and, as will be discussed may dramatically reduce the time taken to configure a press for the printing of jobs requiring a high degree of colour accuracy. In preferred embodiments, it is envisaged that the method of the present system may be incorporated into the print cycle of a press, and is comprised in a fully automated system, enabling the requirement of having a press operator manage and calibrate the ink colour settings of the press to be dispensed with.

Figure 1:
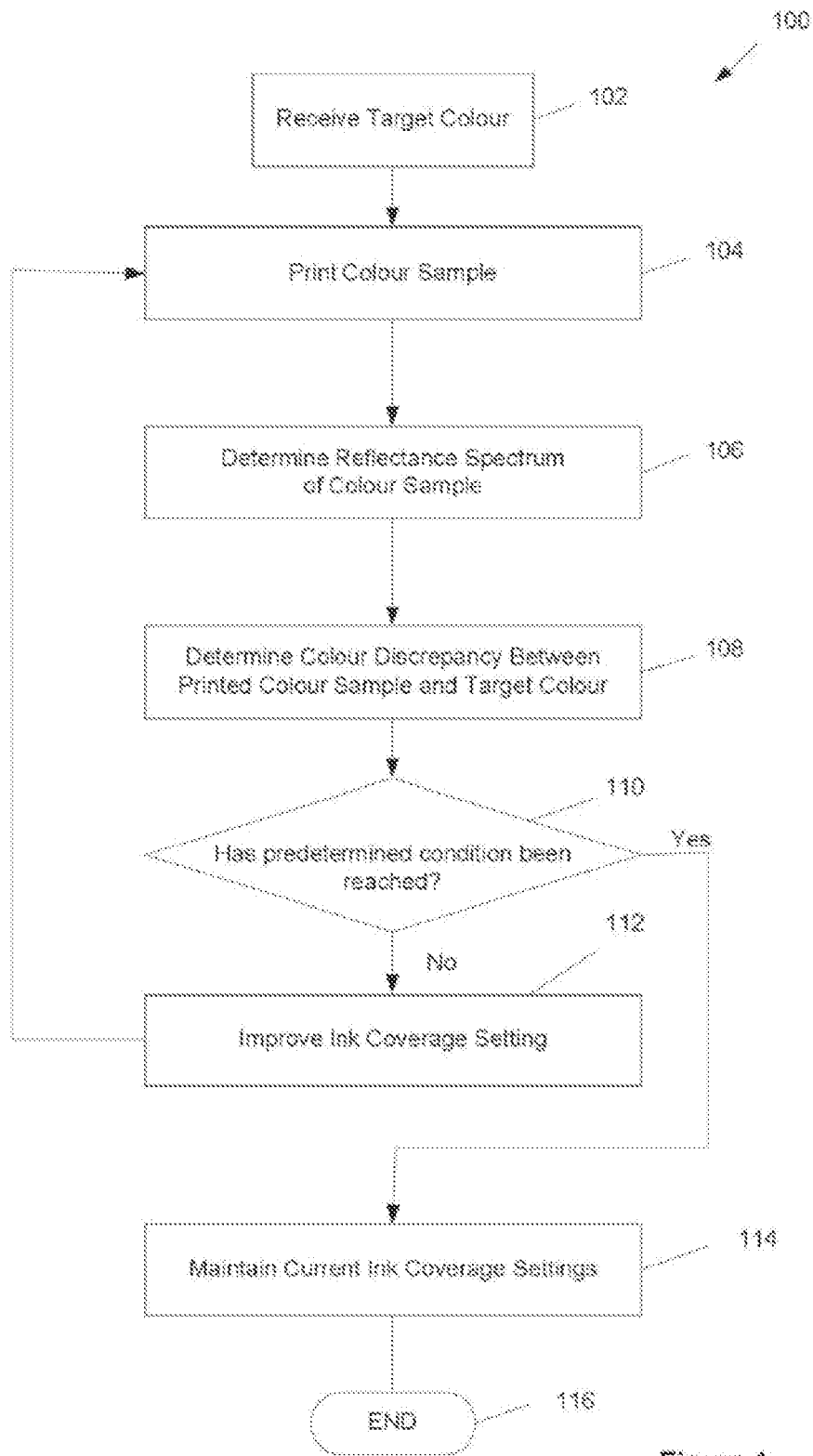
FIG. 1 is a process flow chart illustrating the general method of accurately printing a target colour as provided by an aspect of the present invention.

FIG. 1 is a flow chart illustrating the general outline of the method 100 of the present invention.

A target colour is received 102, whereby the target colour may be defined in terms of Lab coordinates, wherein it is understood that the term Lab coordinates refers to the coordinates of a selected colour in the Lab colour space commonly used in the field of colourimetry. Alternatively, the target colour may be defined in terms of Pantone number. Either colour space, or any other appropriate colour space, may be used for defining the target colour. In alternative embodiments of the present invention, which are discussed at the end of the description, the target colour of a printed sample, may be specified directly from measurements of its light spectrum.

The following discussion will assume that the target colour is defined in Lab coordinates for the sake of convenience however, it is to be appreciated that the target colour could equally be defined in terms of Pantone number or any other colour space coordinates, without affecting the description of embodiments found here.

On the basis of the received target colour coordinates 102, the press prints a colour sample 104. It is common to use conventional colour tables, such as Pantone or regular colour tables, to determine the particular ink coverage setting required to reproduce the target colour, as defined by the received target colour coordinates 102, on a printable substrate. The ink coverage settings used will be dependent on the characteristics of the particular press. A majority of conventional presses adopt a C, M, Y, K ink colour space, wherein the letters are abbreviations for Cyan, Magenta, Yellow, and Black and respectively correspond to the colour of the different inks used in the press. Any printed colour within the colour gamut of the press is reproduced by a particular combination of the aforementioned inks. It should be appreciated that the method and system of the present invention is not restricted to any particular presses ink colour configuration and may be used in any press regardless of the adopted ink colour configuration. On the basis of the received target colour coordinates 102, the associated ink coverage required to reproduce the target colour is determined, by making use of predetermined conversion data, mapping between the Lab colour space and the ink colour space of the press. As mentioned previously, this conversion data may be in the form of conventional colour tables, such as the Pantone colour table. As is well known in the art, there exist a number of different colour conversion tables which may be used for determining the required ink coverage setting from a Lab colour space coordinate and it is immaterial for the purposes of the present invention which colour table is used. A colour table may be needed in the embodiment described only for providing the initial ink coverage setting for printing the first colour sample 104 on a printable substrate. Alternatively, the initial ink coverage setting may be provided by a random ink coverage combination, or simply 50% coverage from each ink.

The reflectance spectrum of the colour sample is determined 106 by measurement of the electromagnetic radiation reflected from the printed colour sample, when the sample is illuminated by controlled incident electromagnetic radiation. The reflectance spectrum provides a quantifiable means for defining the perceived colour of the printed sample The reflectance spectrum is then used to determine the colour discrepancy between the printed colour sample, and the target colour 108. It is then determined whether a predetermined condition has been satisfied 110. It is envisaged that the predetermined condition may be associated with the magnitude of the determined colour discrepancy.

If the predetermined condition 110 has not been satisfied, then an improved ink coverage setting is determined 112, a further colour sample is printed by the press, and steps 104 through 110 are repeated until the predetermined condition is satisfied. A satisfied predetermined condition confirms that the colour difference with respect to the next suggested printed colour is acceptable in which case the current ink coverage settings of the press are maintained 114, and the method is ended 116. In certain embodiments of the present invention it is envisaged that the predetermined condition may relate to the perceivable discrepancy between the target and printed colour. The predetermined condition is satisfied when the perceivable discrepancy is below a predetermined threshold value, or when a fixed number of iterations of the method are reached.

As the reader skilled in the art will appreciate, it is common for the printed colour output of a press to degrade over the course of a plurality of printing runs. Accordingly, it is envisaged that the method of the present invention may be automatically performed before each printing process requiring a high degree of accuracy and also to maintain the press calibrated at all times. The quality of a printed colour is also dependent on the substrate on which it is printed. The conversion factors in conventional colour conversion tables are defined with respect to specific types of substrate and ink. Even the time and conditions in which the substrates are stored may affect the printing results. Use of a colour conversion table with a substrate different from the substrate on which the conversions of the conversion table are based is likely to lead to poor printed results. In practice, to ensure accuracy, this may lead to a press operator having to use a specific colour conversion table for each different type of printable substrate used, and for each batch of ink. The method of this aspect of the present invention dispenses with this requirement and ensures that a press is able to accurately reproduce a target colour on any type of printable substrate.

Figure 2:
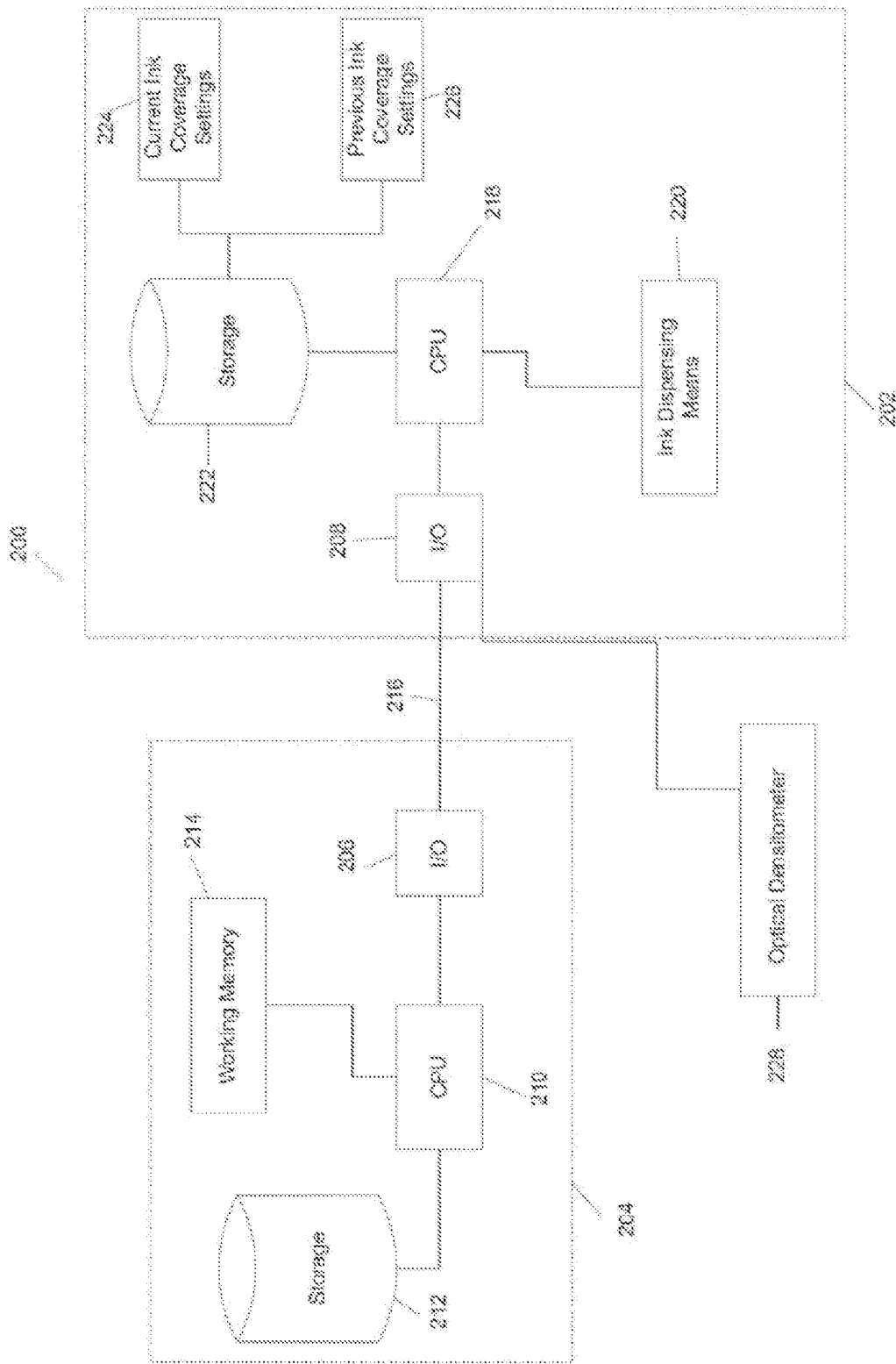
FIG. 2 is a schematic diagram illustrating the hardware setup used in an embodiment of the present invention.

FIG. 2 illustrates the hardware 200 required to implement a method of accurate printing of a target colour in accordance with an embodiment of the present invention. It will be appreciated that such a method may equally be used with a number of different hardware arrangements not explicitly disclosed herein. FIG. 2 illustrates a system comprising a press 202 and a processing unit 204, which may be peripheral to the press 202. The processing unit 204 may be a computer comprising: an I/O means 206 capable of communicating with the press 202 via the press' I/O means 208; a CPU 210 for performing a plurality of calculations required to determine an improved ink coverage setting; non-volatile storage means 212; and working memory 214. Communication channel 216 allows data to be transmitted between the processing unit 204 and the press 202. Such data may refer to the current ink coverage settings of the press 202, the improved ink coverage settings determined by the processing unit 204, and any other data required by the processing unit 204 to determine the improved ink coverage settings. In addition to containing an I/O means 208, the press 202 comprises: a CPU 218 for processing ink coverage settings; ink dispensing means 220 comprising the ink cartridges and dispensing mechanism for controlling the amount of ink dispensed on the substrate; storage means 222 for storing amongst other things, data relevant to the current ink coverage settings of the press 224, and the previous ink coverage settings of the press 226. In addition, an optical densitometer 228 capable of measuring the intensity of the electromagnetic radiation reflected from the colour patch, is in communication via communication channel 230, with the press 202. In a preferred embodiment the optical densitometer 228 is fitted within the housing of the press 202 and placed such that it is located in the paper path of the press 202 after the ink dispensing means 220. This arrangement ensures that the reflectance spectrum of the printed colour sample may be determined immediately after the sample has been printed, and allows a plurality of colour samples, each determined in accordance with successive iterations of the method of the present invention, to be printed on the same substrate. In such an arrangement the optical densitometer may be referred to as an "In-Line Densitometer" (ILD). Hereinafter the densitometer will be referred to as the ILD, however it will be appreciated that the densitometer need not be located in the substrate path of the press 202 in all embodiments of the invention.

Figure 3:
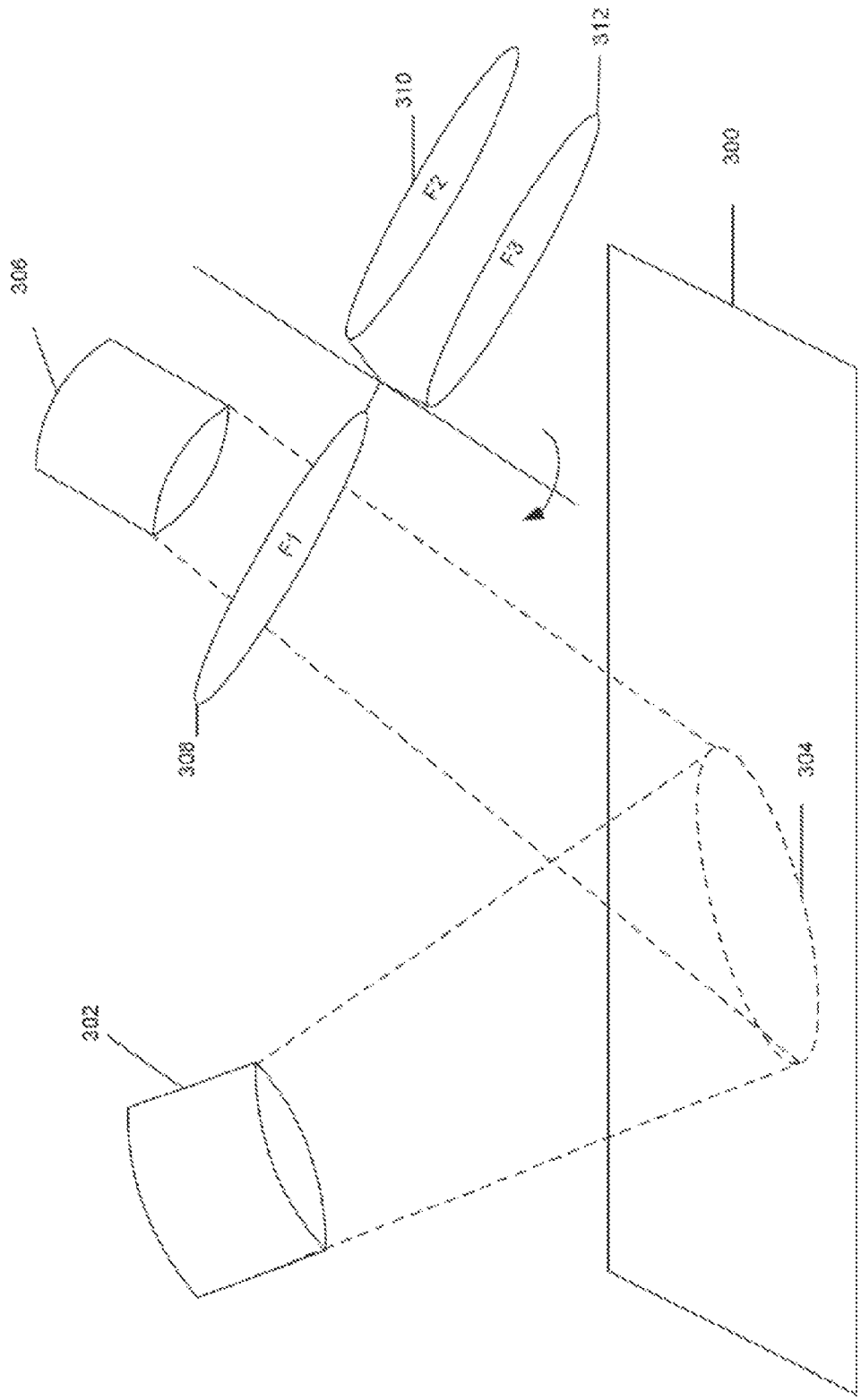
FIG. 3 is a conceptual model of the optical densitometer as used in embodiments of the invention to measure the intensity of the electromagnetic radiation reflected from a colour sample.

FIG. 3 illustrates a conceptual model of how the ILD 228 functions. A known illumination source 302 emits electromagnetic radiation to illuminate an area 304 of a printed colour sample 300. The illumination source 302 is assumed to achieve a steady-state, time-invariant emission of electromagnetic radiation. The electromagnetic radiation emitted by the illumination source 302 is reflected by, or transmitted through, a sample 300, with electromagnetic radiation reflected from, transmitted through, or emitted from the illuminated sample falling on an electronic detector 306. One of a plurality of filters 308-312 is placed in the path of the reflected or transmitted electromagnetic radiation between the sample 300 and detector 306 so that the detector 306 receives only projections of the reflectance spectrum on some known filters 308-312, when they are in place.

As shown in FIG. 3, each of the various filters 308-312 can be rotated into position within the electromagnetic-radiation path in order to determine the intensity of a particular wavelength or frequency range of the reflected electromagnetic radiation. Thus, measurement, by the detector 306, of intensities with different filters generates a plurality of narrow bandwidth intensity measurements. The illustrated embodiment comprises three filters 308-312 and three different intensity measurements are measured. The method for determining the continuous reflectance spectrum from a finite number of intensity measurements of the reflected electromagnetic radiation, is the subject of the applicant's related patent application number WO PCT/US 2009/000622 filed 30 Jan. 2009, and is hereby incorporated by reference to the extent permissible by law. With knowledge of the ILD sensitivity function provided by the manufacturer, knowledge of the finite printable colour range of the press, which effectively acts as a boundary condition on the reflectance spectrum of the printed colour sample, and knowledge of the intensity measurements, one may determine the reflectance spectrum of the colour sample. Determination of the reflectance spectrum provides a means for quantifying the colour of the printed sample and therefore provides one with a means for comparing the target colour and the colour of the sample to determine the accuracy with which the press is reproducing the target colour.

Figure 4:
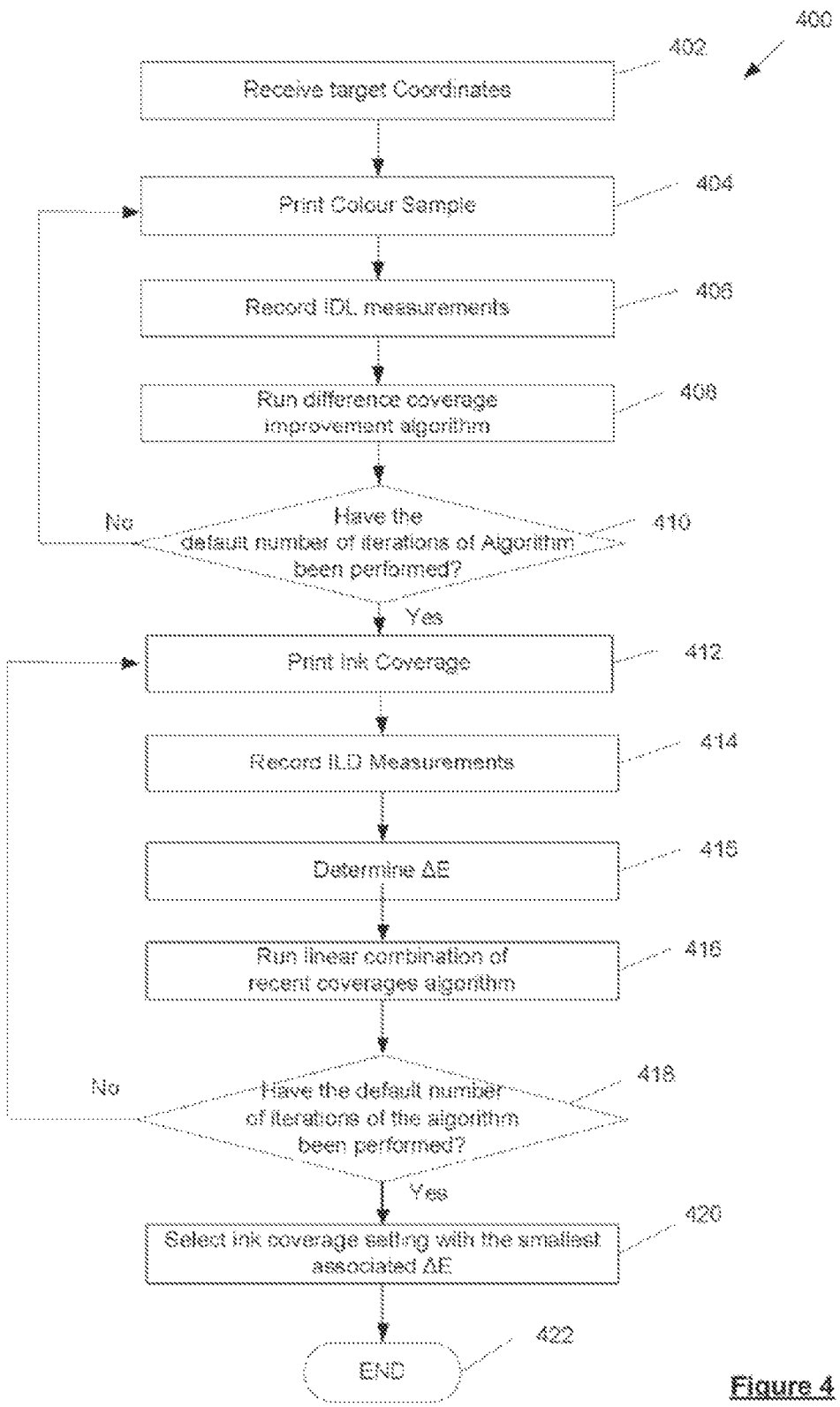
FIG. 4 is a detailed process flow chart illustrating a method of accurately printing a target colour according to an embodiment of the present invention.

FIG. 4 illustrates a specific embodiment of a method for accurate printing of a target colour 400 according to an embodiment of the present invention, illustrating how the improved ink coverage settings may be determined. In the illustrated embodiment, two different algorithms are used to determine the improved ink coverage setting, and are featured respectively in steps 408 and 416.

As with the method of FIG. 1, the target colour coordinates are received 402. The target colour may be defined in either Lab coordinates, or alternatively, in XYZ-colour coordinates, where the XYZ-colour coordinates refer to XYZ three dimensional colour space. The ink coverage settings corresponding to the target colour coordinates, may be determined by CPU 210 and sent to the press 202 via shared communications channel 216. Colour conversion tables may be used to determine the initial required ink coverage settings for printing the first colour sample. However, as mentioned previously, any other ink combination can be used as well. In subsequent iterations, the required ink coverage settings are determined using the methods described below. The initial ink coverage setting defines a starting point, that the below described methods use as the initial basis for calculating an improved ink coverage setting. The ink dispensing means 220 are configured in accordance with the received ink coverage settings to print a colour sample 404. The ink coverage settings for each printed colour sample are stored in storage means 222 local to the press 202. The ILD 228 takes a number of reflectance spectrum projections as measurements 406, which will be referred to as the "ILD measurements". The number of measurements is conditioned by the number of different filters of the ILD. In a preferred embodiment where the ILD comprises three different filters, three reflectance spectrum projection measurements are made.

A "Difference Coverage Improvement Algorithm" 408 is then run to determine, on the basis of the determined reflectance spectrum of the printed colour sample, an improved ink coverage setting to accurately print the target colour. The details of the "Difference Coverage Improvement Algorithm" are discussed with reference to FIG. 5 below.

Due to the practical limitations of the theoretical colour models used within the "Difference Coverage Improvement Algorithm" 408, in certain embodiments it may be that the colour values (defined as coordinates in colour space) of the series of determined improved ink coverage settings, converge to a finite value which is not equivalent to the target colour value. In such embodiments any further successive iterations of the "Difference Coverage Improvement Algorithm" will not provide improved ink coverage settings, which improve the colour discrepancy with respect to the target colour. In certain embodiments, a default number of iterations of steps 404-410 are performed and the determined improved ink coverage settings, along with the determined colour discrepancy, are stored in either local storage means 222, or in storage means 212. The specific storage location is irrelevant so long as the values are accessible for future analysis.

The concept of a metric or distance function between the target colour and the colour of the printed sample can be used to quantify the colour discrepancy between the target colour and the colour of the printed sample, provided that both colours are expressed in the same coordinate basis. The reader skilled in the art will appreciate that any colour may be defined in terms of a point within a colour space. To this end, either Lab or XYZ-colour coordinates may be used for determining the colour discrepancy. The discrepancy may be represented by a metric, that is by the distance between the two colour coordinates in colour space. In practice any printed colour whose discrepancy with the target colour is not perceptible to the human eye, may be considered to be an accurate reproduction of the target colour. For this purpose the metric used to describe the colour discrepancy should incorporate a weighting system to reflect the perceptual sensitivity of the human eye, when determining the colour discrepancy. In preferred embodiments the determined colour discrepancy may be defined in terms of $\Delta E$. As the skilled reader will appreciate, CIE is a non-linear metric function which takes into consideration the perceptive sensitivity of the human eye with respect to different wavelengths of light. $\Delta E$ thus quantifies the discrepancy between two colours in terms of the perceptive sensitivity of the human eye. The mathematical definition is under continuous revision and improvement by the International Commission on Illumination (CIE). At present the most accurate definition of $\Delta E$ is $\Delta E2000$. The interested reader is referred to the CIE for a thorough discussion and definition of $\Delta E$. For accuracy it is envisaged the colour discrepancy is determined using the most recent definition of $\Delta E$-$\Delta E2000$. The skilled reader will appreciate that other definitions of $\Delta E$, or other ways of quantitatively defining, the difference between two colours, could be used in embodiments of the invention.

In a preferred embodiment, the default number of iterations 410 of steps 404-410 is seven, provided that the successively determined ink coverage settings have not previously converged. If the "Difference Coverage Improvement Algorithm" determines the improved ink coverage settings have converged, or the default number of iterations have been exhausted, then the method 400 proceeds to step 412 where a colour sample is printed in accordance with the last determined improved ink coverage setting, and the ILD measurements of the colour sample are taken 414.

To further improve the determined ink coverage settings, a second algorithm is run, referred to as the "linear combination of recent coverages algorithm." On the basis of the plurality of determined ink coverage settings and associated $\Delta E$ values determined in successive iterations of steps 404-410, which are stored in either local storage means 222, or in peripheral storage means 212, an improved ink coverage setting is estimated which minimises $\Delta E$ with respect to the target colour. The previously determined improved ink coverage settings serve as reference points on which to base the subsequent estimated improved ink coverage settings. A new colour sample is printed in accordance with the most recent estimated improved ink coverage setting and ILD measurements are taken of the printed colour sample. Steps 412-418 are repeated until a default number of iterations have been performed. The determined improved ink coverage settings are stored along with the associated $\Delta E$ values in either storage medium 212 or 222. The gathered improved ink coverage settings data and associated $\Delta E$ are analysed by either CPU 210 or CPU 218, and the ink coverage setting with the smallest associated $\Delta E$ is selected 420. It is to be noted that the combination of recent coverages need not be linear in alternative embodiments.

Figure 5:
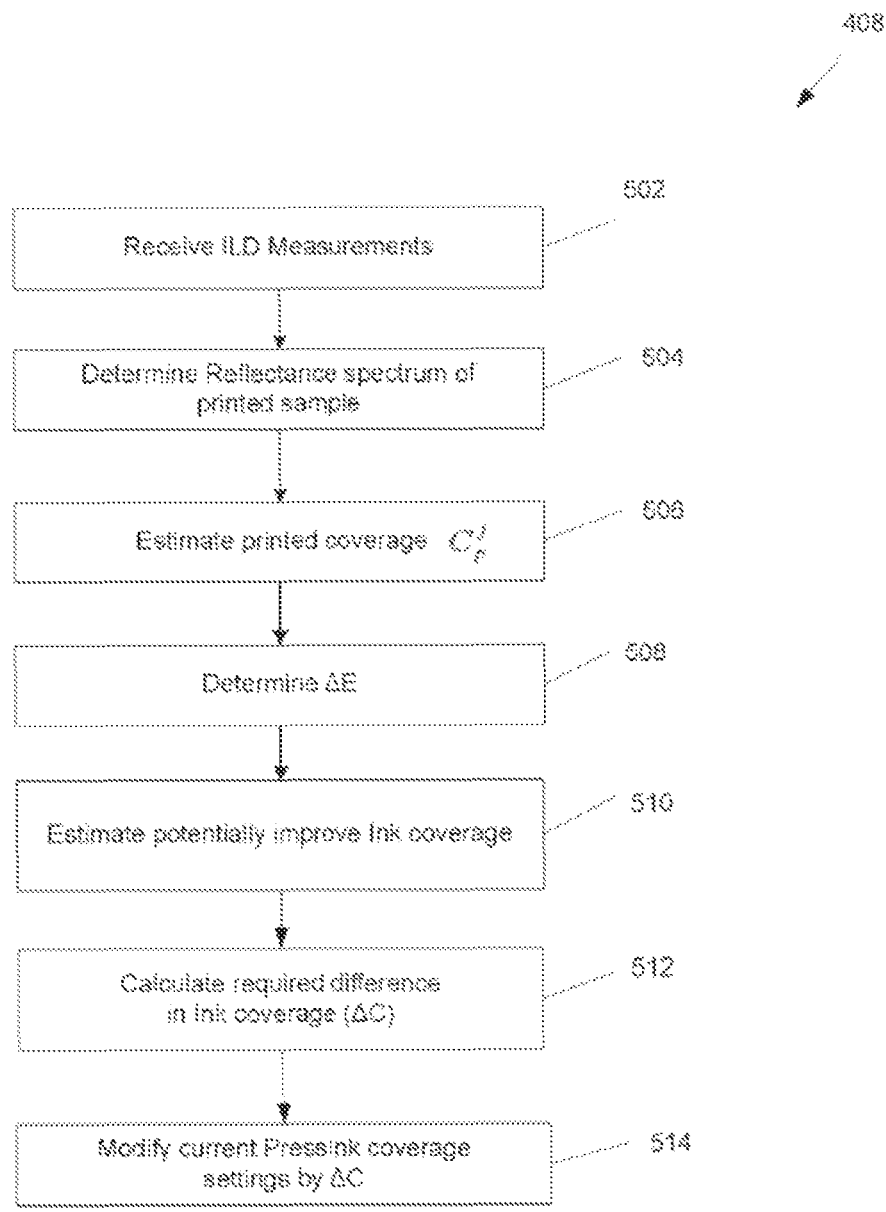
FIG. 5 is a process flow chart illustrating the "Difference Coverage Improvement Algorithm" used in accordance with embodiments of the present invention.

FIG. 5 is a detailed illustration of the "Difference Coverage Improvement Algorithm" 408. The ILD measurements are received 502 and the reflectance spectrum estimated 504 from knowledge of the ILD intensity sensitivity function. The ILD sensitivity function relates the reflectance spectrum of a colour sample to the ILD intensity measurements, and can be viewed as a function P which projects a reflectance spectrum s to a filter measurement vector m, $$P \cdot s = m \quad (1)$$

where the components of m are the observed ILD measurements. Equation (1) is an underdetermined linear system of equations, where the number of unknowns (s) is larger than the number of equations (the number of measurements m). To solve equation (1), prior knowledge of the source of the printed colour is used—the fact that it was printed by a press and therefore must lie within the colour gamut of the press. This requirement may be formulized mathematically by using a colour model.

A colour model, as used in the present context, refers to a quantitative model which determines the reflectance spectrum of a print, given the ink coverage combination that generated it. To achieve this, the type of printable substrate used and the ink colour space of the press are normally incorporated into the model as parameters. In the below described embodiment reference is made to the cellular Neugebauer colour model for illustrative purposes only. However, one could equally use any other colour model, such as the regular Neugebauer colour model or the Yule-Nielsen colour model, and it is envisaged that alternative embodiments using, for example the Yule-Nielsen model, may provide more accurate results.

The Neugebauer colour model is used to estimate the ink coverage settings from the reflectance spectrum of the printed colour sample. The Neugebauer model describes the relationship between the ink coverage values and the expected reflectance spectrum. There exist a number of models describing the relationship between the values of the ink coverage settings and the associated reflectance spectrum, and that any one of these models could be used in conjunction with embodiments of the present invention. The Neugebauer colour model itself has a number of variants, such as the cellular Neugebauer colour model. For a press adopting a CMYK ink colour space arrangement, the colour of a printed sample is a function of the CMYK quadruple coordinate. The expected reflectance spectrum for light reflected from the sample can be computed from the fractional coverages of the four inks used in printing the sample. In accordance with the Neugebauer model, the estimated reflectance spectrum is computed as the sum of a set of experimentally determined spectral vectors multiplied by a real coefficient.

The Neugebauer model for four inks is, $$N(a_c, a_m, a_y, a_k) = \sum_{d \in D} A_d(a_c, a_m, a_y, a_k) \cdot p_d \quad (2)$$

where D is the set of all possible combinations of the four inks, $p_d$ is the reflectance spectrum when printing full coverage from each ink in the combination $d \in D$, and $A_d$ is a real coefficient. The experimentally determined spectral vectors and the real coefficients will be collectively referred to as the Neugebauer parameters. The accuracy of the estimated reflectance spectrum is dependent on the accuracy of the Neugebauer parameters. It is to be appreciated that the Neugebauer model is valid and accurate only for the inks and media that characterise it. Small variations of the ink, media, or even the press can affect the accuracy of the predicted reflectance spectrum. The reflectance spectrum of the printed sample is estimated in step 504 by solving the following cost function, $$\{s, a_c, a_m, a_y, a_k\} = \min_{s, a_c, a_m, a_y, a_k} \|(N(a_c, a_m, a_y, a_k) - s)\|_2^2 + \lambda \|Ps - m\|_2^2 \quad (3)$$

which may be equivalently expressed as, $$\{s^j, C_p^j\} = \arg\min_{s^j, C_p^j} (\|N(C_p^j) - s^j\|_2^2 + \lambda \|Ps^j - m^j\|_2^2) \quad (3a)$$

where λ is a weighting parameter, and j=0, 1, ..., N, where N is the total number of iterations of the algorithm; and $C_p^j$ is the estimated ink coverage of the $j^{th}$ printed colour sample. There are two unknowns in equation (3), the ink coverage settings ($a_c, a_m, a_y, a_k$) (equivalently designated as $C_p^j$) and s. As a consequence equation (3) must be solved iteratively, that is by trial and improvement. However, we can introduce certain boundary conditions which restrict the possible set of solutions, since both must be within the colour gamut of the press. Mathematically this may be achieved by constraining the solution of equation (3) to the Neugebauer solution space. The computational complexity of equation (3) requires the processing power of CPU 210, or alternatively, should the press 202 be equipped with a sufficiently powerful CPU 218, then the iterative calculation may be solved locally. Solving equation (3) determines the reflectance spectrum s that matches the ILD measurements m and reveals the estimated ink coverage setting that generated the reflectance spectrum s 506. The reader skilled in the art will appreciate that the ink coverage settings of the press are not necessarily accurate reflections of the actual ink coverages of the printed samples. This may be due to a number of practical reasons such as noise, drift or inaccuracies in the assumed model. For this reason when solving equation (3) the ink coverage settings are assumed to be unknown. It is to be appreciated that where for illustrative purpose FIG. 5 depicts steps 504 and 506 as being distinct two steps, in practice both the estimated reflectance spectrum of step 504 and the estimated print coverage $C_p^j$ are determined by solving equation (3) and in practice steps 504 and 506 may be considered as one step in the algorithm.

As described previously, ΔE, the discrepancy between the target colour and the printed colour sample, is determined 508 and stored for future reference in a storage means. Determining the distance between the target colour and the colour of the printed sample in colour space, requires that both colours be expressed in the same coordinate basis. Either Lab coordinates, or XYZ-colour coordinates may be used. The reader skilled in the art will appreciate that ΔE is conventionally defined in Lab colour space. However, it can equally be defined in XYZ-colour space. Mapping ΔE from Lab colour space to XYZ-colour space is non-trivial and the transform is non-linear. Working in XYZ-colour space presents some advantages as it is computationally simpler to minimise the discrepancy between the target colour and the colour of the printed sample in XYZ-colour coordinates as opposed to working in Lab colour coordinates. The XYZ-colour coordinates of the printed colour sample may be determined from the reflectance spectrum, using the colour matching functions (CMF), $$X = CMF \cdot s \quad (4)$$

where X are the XYZ-colour coordinates of the colour associated with the reflectance spectrum s, and CMF is a function representing the sensitivity of the human eye. Furthermore, the target colour must also be expressed in terms of XYZ-colour coordinates, which may be achieved by application of the transform function mapping from Lab colour space to XYZ-colour space. As mentioned previously, the transform mapping between the two colour spaces is not linear and is non-trivial. Similarly $\Delta E$ may be determined in Lab coordinates. This requires that the XYZ-colour coordinates of the printed sample are mapped to Lab coordinates using a suitable transform function.

It should be appreciated that any colour coordinate basis may be used in accordance with embodiments of the present invention. In the following discussion where a particular coordinate base is referred to, the skilled reader will appreciate that any other coordinate basis may be used instead.

After $\Delta E$ is determined and stored, a potentially improved ink coverage setting is estimated 510 by comparison of the XYZ-coordinates of the reflectance spectrum of the colour sample and the XYZ-coordinates of the target colour. The estimated potentially improved ink coverage setting is estimated by minimising the cost function, $$\{C_p^{j+1}\} = \arg\min_{C_p^{j+1}} \|(CMF \cdot N(C_p^{j+1}) - LAB2XYZ(L_t)\| \quad (5)$$

where is the estimated potentially improved ink coverage setting, LAB2XYZ is a function mapping between Lab coordinate space and XYZ-colour coordinate space, and $L_1$ are the Lab coordinates of the target colour. Using the estimated potentially improved ink coverage ($C_p^{j+1}$), the charge in ink coverage settings ($\Delta C$) 512, required to minimise $\Delta E$, is determined with respect to the press' current ink coverage settings. This is achieved by calculating the difference in ink coverage settings between the estimated potentially improved ink coverage ($C_p^{j+1}$) and the ink coverage ($C_p^j$) determined from the reflectance spectrum when solving equation (3).

$$\Delta C = C_p^{j+1} - C_p^j \quad (6)$$

Equation (6) describes the change in ink coverage setting required to provide an improved ink coverage setting. To be precise this represents the change in ink coverage setting which when added to the current ink coverage setting of the press, will provide an improved ink coverage setting. In step 514 the press' current ink coverage setting ($C^j$) is modified by an amount equal to the calculated required change in ink coverage setting ($\Delta C$), $$C^{j+1} = C^j + \Delta C \quad (7)$$

to determine the improved ink coverage setting of the press for the next iteration. The reader skilled in the art will recognise that the improved ink coverage setting $C^{j+1}$ is estimated using the Neugebauer model, the accuracy of which is dependent on the accuracy of the Neugebauer parameters. The described "Difference Coverage Improvement Algorithm" does not necessarily guarantee that all successive iterations of the algorithm provide an improved ink coverage setting which minimises $\Delta E$. To increase the accuracy of the method it is envisaged that the Neugebauer parameters used in the "Difference Coverage Improvement Algorithm" may be selected or customised to accurately represent the type of printing substrate used. This would require a number of different parameter files to be stored, which are locally accessible by the press in either storage media 222 or 212, each representing a different type of printing substrate, and would require selecting the correct parameter file on the basis of the type of substrate used. Use of customised Neugebauer parameter files is not essential for improving the results of the present invention as will become clear from the following discussion of FIG. 6.

In theory, accuracy could be improved by generating a new set of Neugebauer parameters. However, this requires printing 81 colour patches, taking the prints manually to an accurate spectrometer, and measuring them. This process can take a few hours and is not suitable for practical applications.

As mentioned previously, it may be the case that the determined improved ink coverage settings $C^{j+1}$ converge, (convergence in the current context refers to the condition where $\Delta C \approx 0$, and does not imply that $\Delta E = 0$) or that successive iterations of the "Difference Coverage Improvement Algorithm" do not determine improved ink coverage settings that minimise $\Delta E$. In such cases the linear combination of recent coverages algorithm 416 may be used to improve the determined ink coverage setting.

To achieve more accurate results, the minimisation of the printed colour sample and the target colour, as described by equation (5), is performed in Lab coordinates. Equation (5) may be expressed in terms of Lab coordinates by use of the XYZ2LAB function mapping between XYZ-colour coordinate space and Lab colour coordinate space:

$$\{C_p^{j+1}\} = \arg\min_{C_p^{j+1}} \|(XYZ2LAB(CMF \cdot N(C_p^{j+1})) - (L_t)\| \quad (8)$$

To obtain an even more accurate target function, one may minimise the $\Delta E$ measure of the above two expressions, which can be computed as follows:

$$\{C_p^{j+1}\} = \arg\min_{C_p^{j+1}} \Delta E((XYZ2LAB(CMF \cdot N(C_p^{j+1})), (L_t)) \quad (9)$$

Solving these equations is slightly more complex than solving equation (5), and therefore is solved numerically. The solution of equation (9) is more accurate than the solution of equation (5). This method will reduce the degree of uncertainty introduced into the determined ink coverage settings as a result of the non-linear mapping between the two coordinate basis.

Figure 6:
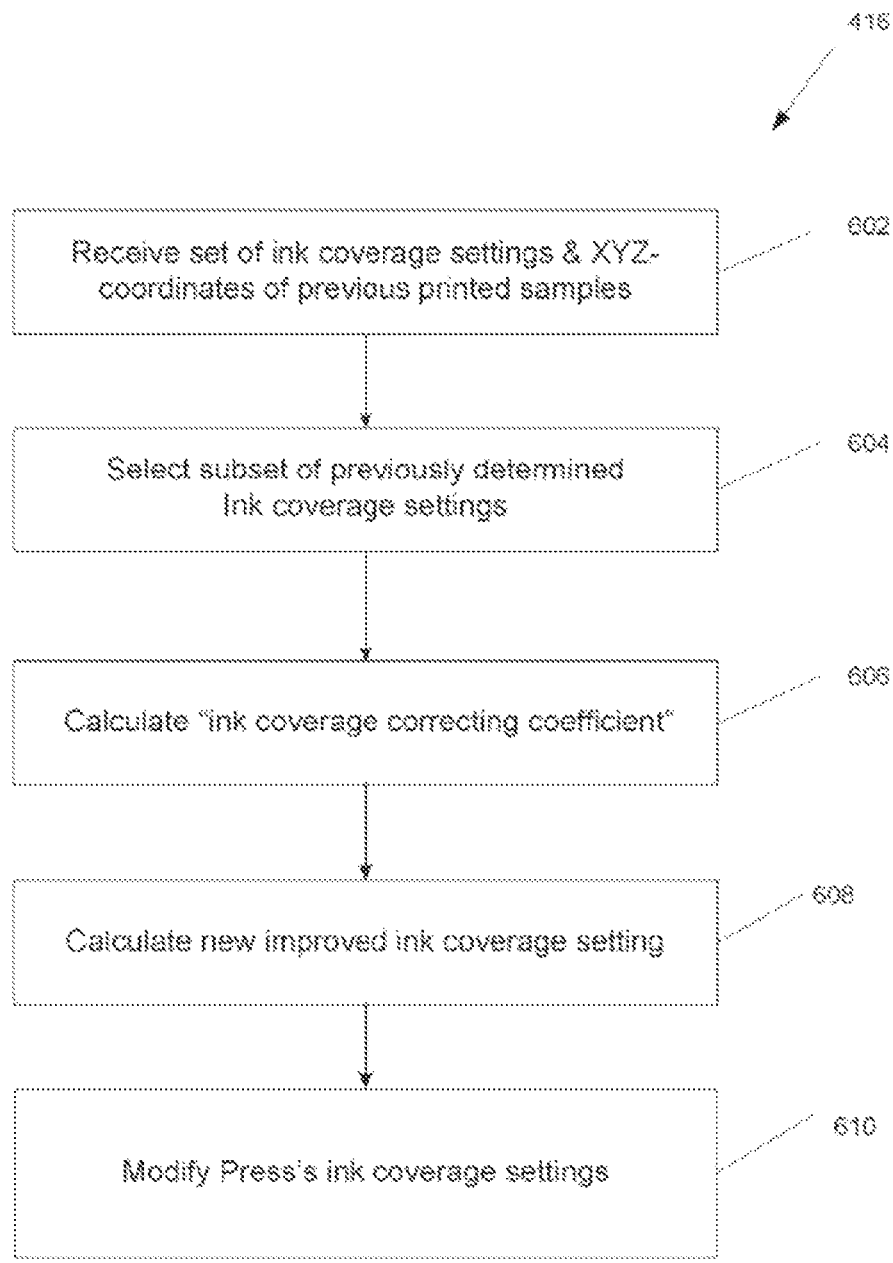
FIG. 6 is a process flow chart of the "Linear Combination of Recent Coverages Algorithm" used in accordance with embodiments of the present invention.

FIG. 6 illustrates the linear combination of recent coverages algorithm in detail. The algorithm uses the plurality of previously determined improved ink coverage settings to estimate a further improved ink coverage setting. Additionally, the linear combination of recent coverages algorithm may be used in those embodiments where the Neugebauer parameters have not been tailored to the specific conditions of the press, or where it is not practical to have to select between a plurality of different Neugebauer parameters depending on the type of substrate or ink being used. Once successive iterations of the "Difference Coverage Improvement Algorithm" no longer provide improved ink coverage settings, then the linear combination of recent coverages algorithm may be used to further improve the determined ink coverage settings. The set of previously determined improved ink coverage settings along with the associated XYZ-coordinates are received 602 from storage means 222 or 212. A subset of the previously determined improved ink coverage settings, with the smallest $\Delta E$, are selected 604 to serve as the basis for the subsequent estimation. An ink coverage correcting coefficient which minimises the colour discrepancy between the target colour and sample colour is determined 606. In certain embodiments the correcting coefficient may be determined as follows. The selected subset of determined ink coverage settings are used to construct the coverage matrix $C=[C_1; C_2; \ldots; C_k]$, where $C_i=[C_i^c, C_i^m, C_i^y, C_i^k]$, and their associated XYZ-coordinates are used to construct a coordinate matrix $X=[X_1; X_2; \ldots; X_k]$, where $X_i=[X_i^x, X_i^y, X_i^z]$. A new improved ink coverage that is closer to the target colour may be determined by finding an ink coverage coefficient $\alpha$ to minimise, $$\min_{\alpha} \|X \cdot \alpha - X^t\|_2^2 \qquad (10)$$

where $X^t$ is a matrix of the target XYZ coordinates. $\alpha$ may then be applied to the coverage matrix to determine the new improved coverage $C^{k+1}$ 608.

$$C^{k+1}=C \cdot \alpha \qquad (11)$$

The presses ink coverage settings are modified in accordance with the calculated new ink coverage setting 610 and a new colour sample is printed, the ILD measurements of the new colour sample are recorded, aid the $\Delta E$ value calculated as illustrated in steps 412-415 of FIG. 4. The linear combination of recent coverages algorithm is repeated using the XYZ-coordinates of the printed colour sample to determine an improved ink coverage correcting coefficient, from which a subsequent improved ink coverage setting is determined. As with the "Difference Coverage Improvement Algorithm", the linear combination of recent coverages algorithm is repeated until a predetermined condition is reached. In certain embodiments and as illustrated in FIG. 4, this condition may be satiated when a default number of iterations of the algorithm have been performed. In certain cases the number of default iterations may be five. It is important to note that the ILD measurements and $\Delta E$ are measured/calculated for each determined improved ink coverage setting. As illustrated in FIG. 4 in step 420, the ink coverage setting with the smallest associate $\Delta E$ value is selected and the settings of the press' 202 ink dispensing means 220 is accordingly changed. The ink coverage setting with the smallest associated $\Delta E$ may be selected from improved ink coverage settings determined using either the "Difference Coverage Improvement Algorithm" or the linear combination of recent coverages algorithm.

In alternative embodiments of the present invention it is envisaged that the predetermined condition is reached when the colour discrepancy between the target colour and the colour of the printed colour sample is within a predetermined threshold value of $\Delta E$. The threshold value of $\Delta E$ may be 1, which is the minimum colour discrepancy discernable by the human eye. Alternatively, the threshold value of $\Delta E$ may be 0.5, or less.

In further alternative embodiments of the present invention it is envisaged that the minimisation of the printed colour sample and the target colour, as described by equation (5) is performed in both XYZ-coordinates and in Lab coordinates (as described by equation (8)). The determined improved ink coverage setting with the smallest associated $\Delta E$ value is selected. In practice the variations of the algorithm may be run in parallel. For example, one set of colour samples may be printed wherein the estimation of the potentially improved ink coverage setting is determined by minimisation of equation (5) in XYZ-colour coordinate space, and a second set may be printed wherein the estimation of the potentially improved ink coverage setting is determined by minimisation of equation (8) in Lab colour coordinate space.

As mentioned previously, in alternative embodiments of the present invention, the target colour may be specified on the basis of a measurement of the reflectance spectrum of a printed target colour sample. Such embodiments may be of particular use in applications where the colour coordinates of the target colour are not available, or where a printed sample of the target colour is available. The optical densitometer 228 is used to measure the projections of the reflectance spectrum of the target colour sample to define a target colour specification. There are at least two variants to this embodiment. In the first variant it is envisaged that the projections of the reflectance spectrum, which are the optical densitometer measurements, are used to estimate the associated XYZ or Lab colour coordinates of the target colour sample, using aforementioned methods, such that the minimisation of equation (5) and/or equation (8) may be performed in either XYZ or Lab colour coordinates. The estimated XYZ or Lab colour coordinates of the target colour sample define the target colour and the "Difference Coverage Improvement Algorithm" remains effectively unchanged. The accuracy of this method will depend on the accuracy of the colour model, and in particular to how accurately the selected colour model models the substrate and inks used to print the target colour sample. For example, if the Neugebauer colour model is used, the Neugebauer parameters must be specific to the ink and media used for printing the target colour sample if accurate results are to be obtained.

A second variant of the aforementioned alternative embodiment may be used to achieve more accurate results, when the specific Neugebauer parameters for the printed target colour sample are unknown, or where it is undesirable to estimate the colour coordinates of the printed colour sample. The projections of the reflectance spectrum of the printed target colour sample are measured by the optical densitometer 228, which may be an in-line optical densitometer (ILD) as described previously. The colour coordinates of the printed target colour sample are not estimated from the optical densitometer measurements—that is from the projections of the reflectance spectrum. In contrast to the previously discussed embodiments, the measured projections of the printed target colour sample are used to define the target colour which is to be accurately printed. In contrast with previously disclosed embodiments, it is not necessary to define $\Delta E$, since the target colour is no longer expressed in either Lab or XYZ-colour coordinate space. The colour discrepancy between a printed colour sample and the target colour may be quantified in terms of the discrepancy between the measured projections of the reflectance spectrum of the two printed samples. The initial ink coverage may be calculated by use of equation (3) or (3a). The "Difference Coverage Improvement Algorithm" is used to determine a required change in ink coverage as previously disclosed, with a few modifications. Since the present embodiment does not require either the colour coordinates of the target colour sample or the colour coordinates of the printed colour samples to be defined, the minimisation of the cost function described in equation (5) is performed with respect to the measured reflectance spectrum projections. The estimated potentially improved ink coverage, as defined by equation (5), may be re-expressed in terms of the measured reflectance spectrum projections by the following cost function:

$$\{C_p^{j+1}\} = \arg\min_{C_p^{j+1}}\|P_{measure} \cdot N(C_p^{j+1}) - P_{measureOnTarget}\|, \quad (12)$$

where $P_{measure}$ is the sensitivity function of the optical densitometer 228, which is specified by the manufacturer; and $P_{measureOnTarget}$ are the measured projections of the printed target colour sample on the sensitivity functions of the available optical densitometer. $P_{measure} \cdot N(C_p^{j+1})$ are the expected measurements of the potentially improved ink coverage (see equation (1)). Equation (12) determines the potentially improved ink coverage by minimising the difference between the projections of the potentially improved ink coverage and the measured projections of the printed target colour sample. The remainder of the steps in the "Difference Coverage Improvement Algorithm", as illustrated in FIG. 5, remain unchanged.

For added efficiency, the methods of the present invention may be used to calibrate a plurality of different colours in parallel. There is no hard requirement that the method be used to sequentially calibrate different colours of a press.

To reduce the amount of white noise from the ILD measurements, several samples of the same colour may be printed and measured, such that the averaged ILD measurement is more accurate. For example, four colour samples may be printed for each determined improved ink coverage setting. The subsequent iteration would then determine the improved ink coverage on the basis of the average ILD measurements.

In an alternative embodiment of the present invention it is envisaged that the a transmission spectrum rather than the reflectance spectrum of the printed colour sample is determined and used to quantify the colour of the printed sample. In yet a further alternative embodiment it is envisaged that the absorption spectrum of the printed colour sample is used to quantify the colour of the printed sample.

A further alternative embodiment of the present invention, which is of particular use in situations where improved printing results are required in a very short time period, is to dispense with the time consuming calculations of the aforementioned "Difference Coverage Improvement Algorithm." In the present embodiment, it is envisaged that the colour coordinates of the desired target colour are provided for. Rather than calculate a required change in ink coverage, colour samples of all the permutations of the ink coverages within a specified range are printed. The ink coverage with the smallest ΔE value is selected. For example one may determine and print all the ink coverages within a range of +/−1% from the initial ink coverage. The ink coverage with the smallest ΔE value is then selected. The number of different colour samples to be printed is dependent not only on the size of the specified range, but also on the incremental unit used between successive ink coverages.

The reader skilled in the art will appreciate that the methods of the present invention may be significantly facilitated by measuring the reflectance spectrum of the printed colour sample directly with a spectrometer. However, such apparatus is extremely expensive and as a consequence not available for the majority of users of commercial and industrial presses.

The invention claimed is:

1. A method for accurately printing a target colour, the method comprising:
    printing, with a first ink coverage, a first color sample corresponding to coordinates of the target color;
    measuring a light spectrum (106) of the first printed colour sample (104), and from the measured light spectrum calculating a colour discrepancy between the first printed colour sample and the target colour (108); and
    calculating an improved ink coverage (112) and printing, with the improved ink coverage (104), a second colour sample corresponding to the coordinates; and
    repeating the measuring and the calculating until a predetermined condition for accuracy of the target colour has been reached (110).

2. A method according to claim 1, wherein the improved ink coverage (112) is determined by calculating a required change in ink coverage from a previously used ink coverage; and
    wherein the current ink coverage is modified in accordance with the calculated required change in ink coverage.

3. A method according to claim 1, wherein the predetermined condition (110) is reached when a perceivable colour discrepancy between the printed colour sample and the target colour is below a predetermined threshold value.

4. A method according to claim 1, wherein the predetermined condition (110) is reached when either:
    a) successive iterations of the determined improved ink coverage (112) do not reduce the colour discrepancy between the printed colour sample and the target colour (108); or
    b) a predetermined number of iterations of the method have been performed.

5. A method according to claim 1, wherein the improved ink coverage (112) is calculated using a colour model, the method comprising:
    calculating the current ink coverage of a printed colour sample (104), from the measured light spectrum (106), and on the basis of which using the colour model to calculate a potentially improved ink coverage.

6. A method according to claim 5, wherein the method is repeated for each printed colour sample (104), to calculate the required change in ink coverage to accurately print the target colour.

7. A method according to claim 5, wherein the improved ink coverage (112) is calculated by calculating the difference in ink coverage between the potentially improved ink coverage and the calculated current ink coverage.

8. A method according to claim 5, wherein the potentially improved ink coverage is estimated on the basis of a colour model, the parameters of which are not specific to either the type of substrate, or the one or more inks used.

9. A method according to claim 5, wherein the colour model is a Neugebauer colour model.

10. A method according to claim 6, wherein an improved ink coverage setting (112) is estimated by:
    selecting a plurality of previously calculated ink coverages; and
    calculating, from the selected plurality of previously calculated ink coverages, the improved ink coverage setting for printing a colour sample.

11. A method according to claim 10, wherein the calculating the current ink coverage of a printed colour sample (104), from the measured light spectrum (106), and on the basis of which using the colour model to calculate a potentially improved ink coverage, are performed in parallel with the selecting a plurality of previously calculated ink coverages, and calculating the improved ink coverage setting for printing a colour sample from the selected plurality of previously calculated ink coverages.

12. A system (200) for enabling accurate printing of a target colour by a press, the system comprising:

an electromagnetic radiation intensity measuring device (228) for measuring a light spectrum of a printed colour sample of coordinates of the target colour printed by a press;

a processing device (204) for calculating a colour discrepancy between the printed colour sample and the target colour on the basis of the measured light spectrum, and for calculating an improved ink coverage setting; and configuration means (218) for configuring an ink coverage setting in accordance with the determined improved ink coverage setting for provision to a press (202), for printing a further colour sample of the coordinates.

13. A system according to claim 12, wherein the electromagnetic intensity measuring device is an optical densitometer (228) located externally to the press (202), and wherein the optical densitometer measures a finite number of narrow-bandwidth intensity measurements and processes the intensity measurements to form the projections of the light spectrum of the printed colour sample.

14. A system according to claim 12, wherein the processing device (204) is remotely located with respect to the press (202), and provided with communication means (216) to communicate with the press.

15. A press (202) comprising a system (200) according to claim 12.

16. A press (202) according to claim 15, wherein the electromagnetic intensity measuring device (228) is an optical densitometer located within the press, and wherein the optical densitometer measures a finite number of narrow-bandwidth intensity measurements and processes the intensity measurements to form the projections of the light spectrum of the printed colour sample (104).

17. A press (202) according to claim 15, wherein the processing device (204) is local to the press.

18. A method of using a colour model for accurately printing a target colour with a press, the method comprising:

estimating a potentially improved ink coverage setting (510), from a light spectrum of a printed colour sample for coordinates of the target color printed using a current ink coverage setting of the press (504); and calculating a required change in the current ink coverage setting of the press (512) by calculating the difference between the potentially improved ink coverage setting and the current ink coverage setting, the method characterised in that:

the potentially improved ink coverage setting is estimated from a colour model and used to print a subsequent printed colour sample of the coordinates.

19. A method according to claim 18, wherein the parameters of the colour model are not specific to either the type of substrate the colour sample is printed on, or on the one or more inks used.

20. A method according to claim 18, wherein the colour model is a Neugebauer colour model.

21. A method according to claim 1, wherein the light spectrum is a continuous spectrum determined from a finite number of narrow-bandwidth intensity measurements made by an optical densitometer and processed to form the light spectrum.

22. A method according to claim 21, wherein the finite number of narrow-bandwidth intensity measurements is three.

23. A method according to claim 21,
wherein the continuous spectrum is determined from the first ink coverage, the finite number of narrow-bandwidth intensity measurements, and an intensity sensitivity function of the densitometer that relates the intensity measurements to the continuous spectrum.

24. A method according to claim 1, wherein the improved ink coverage is calculated from the colour discrepancy.

25. A method for accurately printing a target colour, the method comprising:

measuring a light spectrum (106) of a first printed colour sample (104), printed with a first ink coverage and being a single uniform color; and from the measured light spectrum calculating a colour discrepancy between the first printed colour sample and the target colour (108);

calculating an improved ink coverage (112) by
selecting a plurality of previously calculated ink coverages, and
calculating the improved ink coverage from the selected plurality of previously calculated ink coverages;

printing a second colour sample with the improved ink coverage (104); and repeating the aforementioned steps until a predetermined condition for accuracy of the target colour has been reached (110).

26. A method according to claim 18, wherein the printed color sample is a single uniform color.

* * * * *